United States Patent
Kato et al.

Patent Number: 5,992,928
Date of Patent: *Nov. 30, 1999

[54] MOVABLE WINDOW

[75] Inventors: Yoshifumi Kato; Akiteru Nishio, both of Kariya, Japan

[73] Assignee: Kabushiki Kaisha Toyoda Jidoshokki Seisakusho, Aichi ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/738,474

[22] Filed: Oct. 28, 1996

[30] Foreign Application Priority Data

Oct. 30, 1995 [JP] Japan ................................ 7-306748

[51] Int. Cl.$^6$ ...................................................... B60J 7/00
[52] U.S. Cl. ..................... 296/216.09; 49/482.1
[58] Field of Search ................. 296/216; 52/204.597; 49/482.1, 490.1, 493.1

[56] References Cited

U.S. PATENT DOCUMENTS

| | | | |
|---|---|---|---|
| 4,231,204 | 11/1980 | Krueger et al. | 52/204.597 X |
| 4,266,383 | 5/1981 | Krueger et al. | 52/204.597 |
| 4,509,791 | 4/1985 | Bienert et al. | . |
| 4,881,773 | 11/1989 | Ichinose | 296/216 |
| 4,911,496 | 3/1990 | Fuerst | 296/222 X |
| 5,516,186 | 5/1996 | Scherf et al. | 296/216 |
| 5,538,317 | 7/1996 | Brocke et al. | 296/216 |
| 5,702,779 | 12/1997 | Siebelink, Jr. et al. | 296/216 X |

FOREIGN PATENT DOCUMENTS

| | | |
|---|---|---|
| 0662401 | 7/1995 | European Pat. Off. . |
| 2493238 | 5/1982 | France . |
| 62-199525 | 9/1987 | Japan . |
| 62-203813 | 9/1987 | Japan . |
| 62-214011 | 9/1987 | Japan . |
| 2199067 | 6/1988 | United Kingdom . |

*Primary Examiner*—Dennis H. Pedder
*Attorney, Agent, or Firm*—Morgan & Finnegan, L.L.P.

[57] ABSTRACT

A sliding window slidably fitted in an opening of an automobile roof. A frame made of a hard material, which linear expansion coefficient is substantially equal to that of the vehicle body, is fit into the opening. A hard synthetic resin plate is fit into the frame with a flexible molding arranged therebetween. The molding has a thin section which absorbs deformation of the resin plate caused by changes in the temperature.

13 Claims, 6 Drawing Sheets

MOVABLE WINDOW

BACKGROUND OF THE INVENTION

1. Field of the Invention

The present invention relates to sliding windows, and more particularly to sliding windows that are made of a synthetic resin and provided in vehicle roofs.

2. Description of the Related Art

Figure 7:
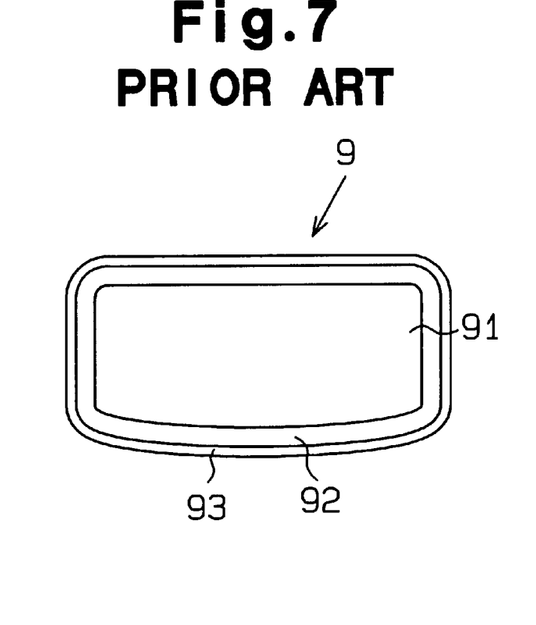
FIG. 7 is a plan view showing a prior art sliding window.
Figure 8A:
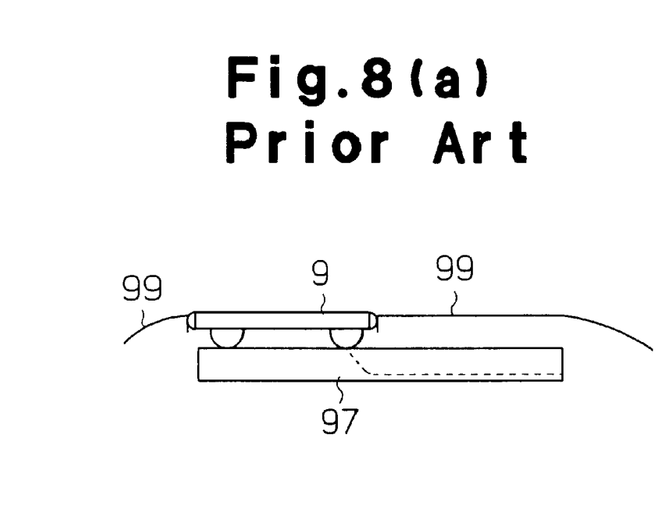
FIG. 8(a) is a diagrammatic drawing illustrating the prior art sliding window in a closed state.
Figure 8B:
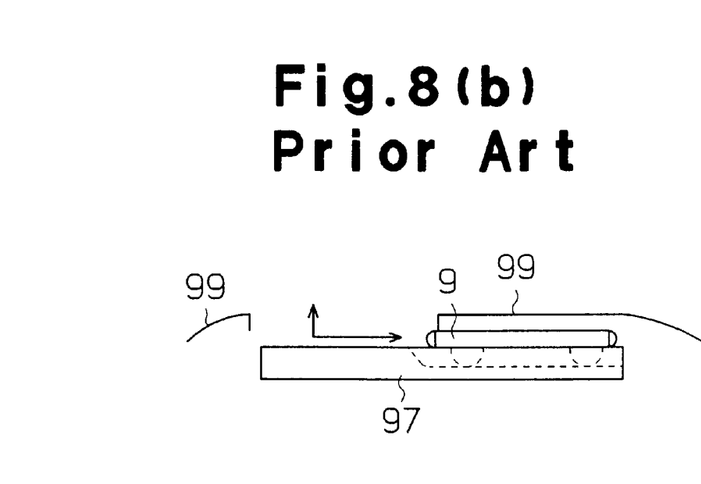
FIG. 8(b) is a diagrammatic drawing illustrating the prior art sliding window in an opened state.

A roof of an automobile may be provided with a sliding window. The window is opened to draw fresh air into the passenger compartment. A typical sliding window 9 is illustrated in FIG. 7. As shown in FIG. 8(a), the window 9 is fit into an opening in the roof 99 of a vehicle. The window 9 may be lowered with respect to the roof 99 and then moved along a pair of guide rails 97 to open the roof 99, as shown in FIG. 8(b).

Figure 9:
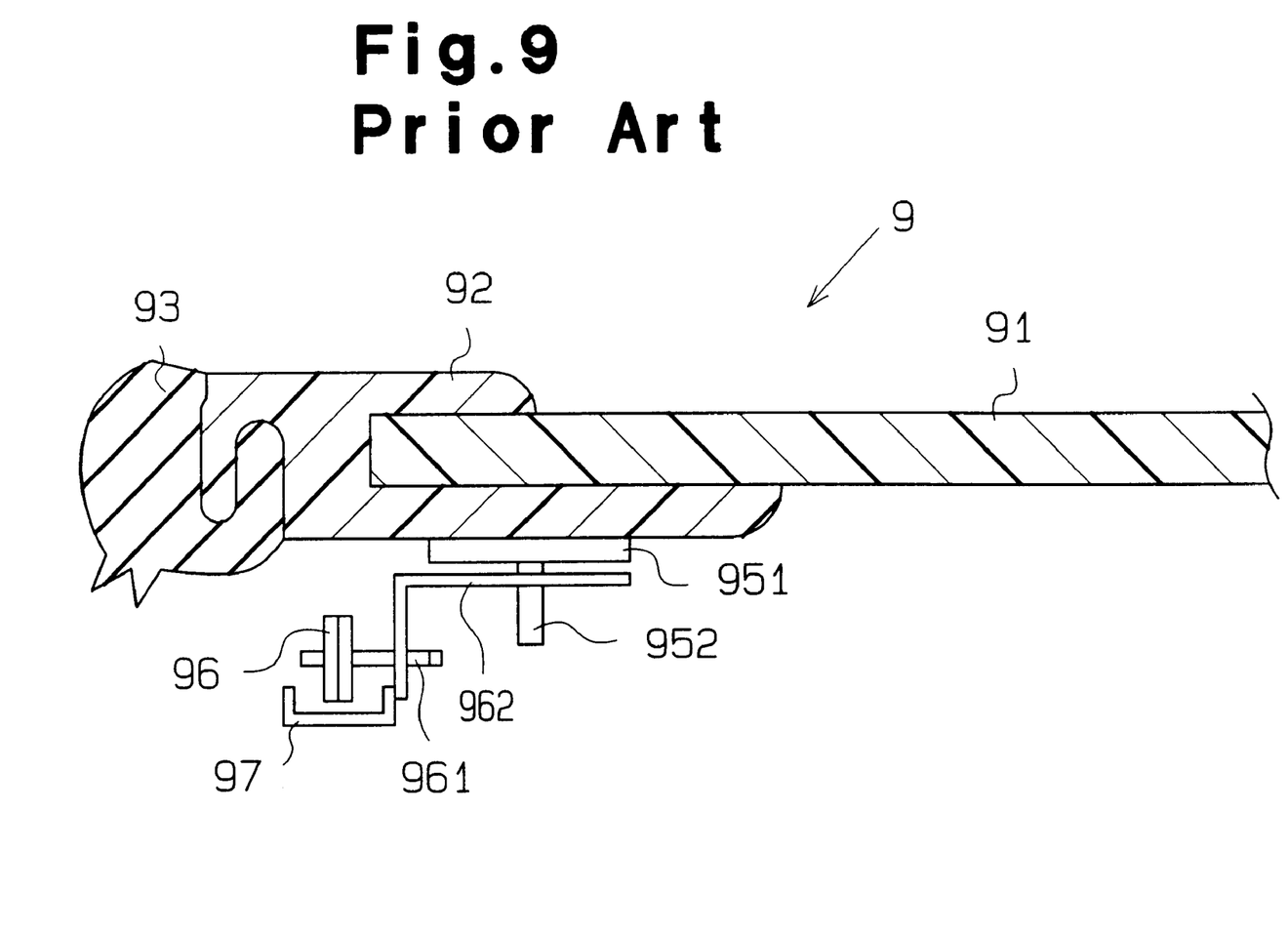
FIG. 9 is a cross-sectional view schematically showing the structure of a prior art sliding window.

As shown in FIGS. 7 and 9, the window 9 includes an inorganic glass 91, a molding 92, and a weather strip 93. The molding 92 encompasses the glass 91. The weather strip 93 encompasses the outer side of the molding 92 to seal the space between the window 9 and the roof 99. The molding 92 is made of a relatively hard resin while the weather strip 93 is made of a soft rubber.

As shown in FIG. 9, a washer 951 and a fastener 952 is attached to the bottom surface of the molding 92 near each side of the glass 91. An elbow-like bracket 962 is held by the fastener 952. A shaft 961, which supports a roller 96, is coupled to the bracket 962. The roller 96 rolls along the rail 97. This simple sliding structure enables opening and closing of the window 9.

During recent years, it has become preferable to use a transparent synthetic resin plate for the sliding window instead of the inorganic glass. A resin plate is lighter and has a better appearance than inorganic glass. When employing a resin plate, it is preferable that major changes are not required in the above sliding structure. In other words, it is preferable that a sliding window employing a resin plate have the same highly reliable structure as the prior art sliding window in which the structure enables sealing of the space between the window and the roof and also enables opening and closing of the window.

However, the linear expansion coefficient of a synthetic resin is greater than that of an inorganic glass. When the vehicle travels, the outdoor temperature causes expansion or contraction of the resin plate. The deformation of the glass results in degradation of the sealing ability between the sliding window 9 and the roof 99. This may degrade the comfortable environment in the passenger compartment.

SUMMARY OF THE INVENTION

Accordingly, it is an objective of the present invention to provide a sliding window that is light, has a superior appearance, and is highly reliable.

To achieve the above objective, an improved sliding window for a roof of a vehicle is provided. The window has a frame that is fitted to the opening. The frame is made of a hard material having a linear expansion coefficient substantially equal to that of the vehicle body. A hard resin plate is fitted to the frame. A soft molding is interposed between the plate and the frame. The molding has a flexible portion to absorb expansion and contraction deformations of the plate based on changes of temperature.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A first embodiment of a resin sliding window according to the present invention will hereafter be described with reference to FIGS. 1 to 6.

Figure 1:
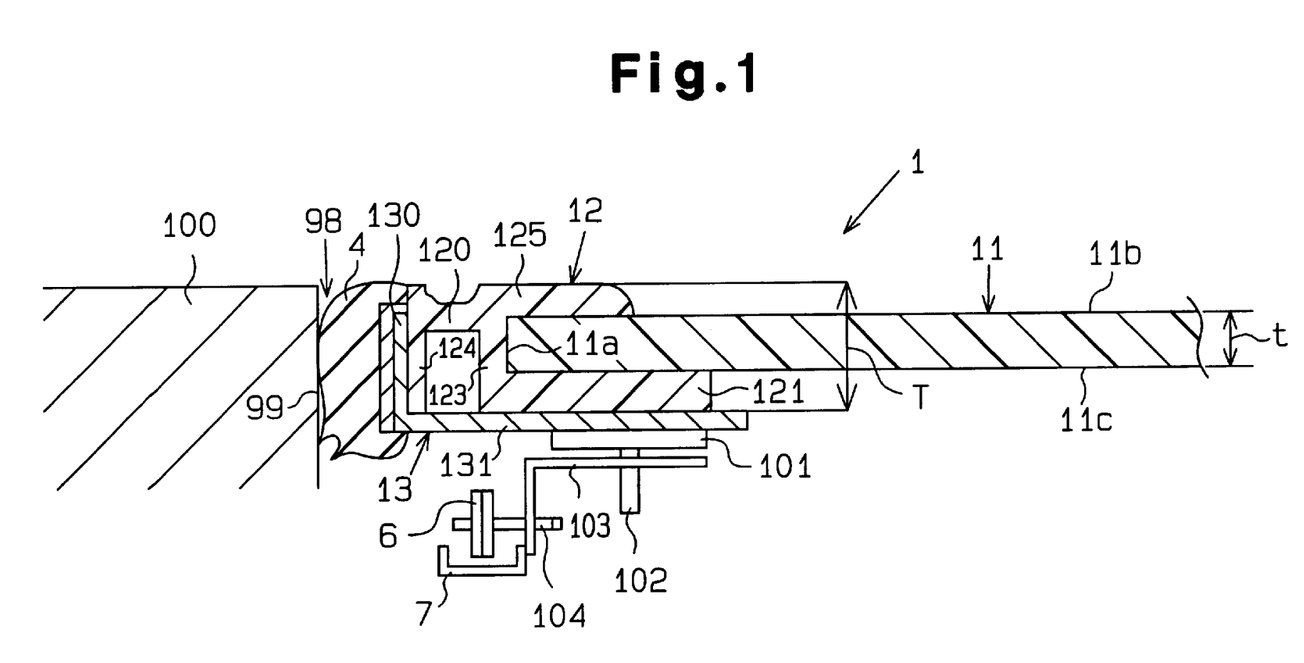
FIG. 1 is a cross-sectional view schematically showing the structure of a sliding window according to a first embodiment of the present invention.
Figure 2:
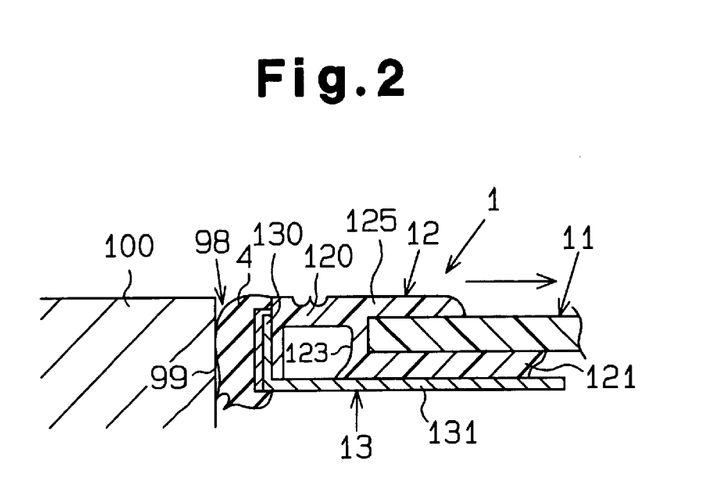
FIG. 2 is a cross-sectional view schematically showing the sliding window in a low-temperature state.
Figure 3:
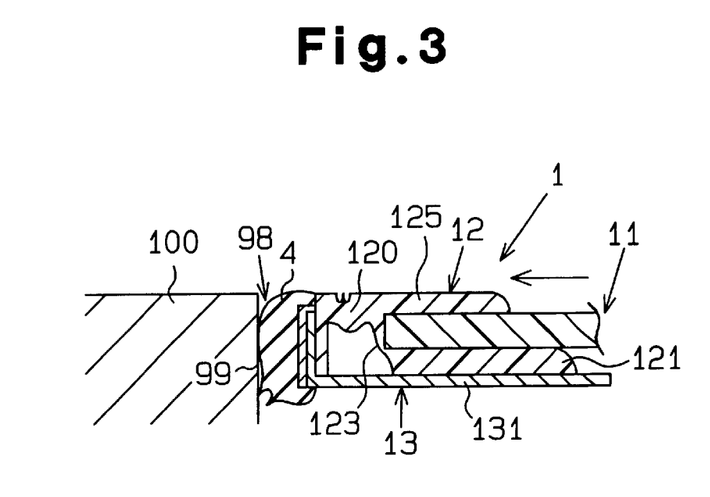
FIG. 3 is a cross-sectional view schematically showing the sliding window in a high-temperature state.

As shown in FIGS. 1 to 3, a sliding window 1 includes a transparent synthetic resin plate 11, a molding 12 arranged peripherally encompassing the plate 11, and a frame 13 arranged peripherally encompassing the molding 12. The sliding window 1 is provided in an opening 98 of a vehicle body outer surface, such as a roof 100 of an automobile which opening 98 has defining peripheral edges 99. The plate 11 has peripheral edges 11a, an outer surface 11b, and an inner surface 11c. The plate thickness is indicated by the letter t.

In this embodiment, the resin plate 11 is made of a transparent polycarbonate (PC) resin and formed through injection molding. However, the material of the resin plate 11 is not limited to PC. Other transparent resins such as polymethylmethacrylate (PMMA) may also be employed as the material of the plate 11. If the transparency of sliding panel is not required, resins that are not transparent may also be used as the material of the plate 11.

In this embodiment, the molding 12 is made of flexible polyvinyl chloride (PVC) and is insert molded around the plate 11. However, the material of the molding 12 is not limited to PVC. Other flexible resin or rubber materials such as ethylene-propylene-diene terpolymer (EPDM) or olefin thermoplastic elastomer (TPO) may also be used. It is preferable that the rubber hardness of the molding 12 be within the range of 20 to 80. The rubber hardness of PVC employed in this embodiment is approximately 40.

The molding 12 has a thickness T. A thin flexible section 120 is defined in the molding 12. The thickness of the thin section 120 is less than the thickness T of the molding 12. The molding 12 also has a second flexible section 121, a plate edge attachment section 123, a frame attachment section 124, and a plate upper surface attachment section 125. All of sections 120, 121, 123–125 are integrally formed with each other as by molding.

In this embodiment, the frame 13 is made of sheet moulding compound (SMC), which is a reinforced plastic. The linear expansion coefficient of SMC is almost the same as that of steel. That is, the linear expansion coefficient of the frame 13, which is $1.8 \times 10^{-5}$ cm/cm/° C., is slightly greater than that of steel ($1.17 \times 10^{-5}$ cm/cm/° C.) but much smaller than that of the resin plate 11 (PC, $7 \times 10^{-5}$ cm/cm/° C.).

The material of the frame 13 is not limited to SMC. However, it is preferable that the frame 13 have a linear expansion coefficient of $1.8 \times 10^{-5}$ cm/cm/° C. or less and be made of a material selected from a group consisting of steel, aluminum, reinforced plastic, or the like. This sufficiently satisfies the requirements of the linear expansion coefficient relationship described above. Reinforced plastics such as bulk molding compound (BMC) and fiber reinforced plastic (FRP) may be used as the material of the frame 13.

As shown in FIG. 1, the frame 13 has an L-shaped cross-section, providing a first leg portion 130 parallel to, but spaced peripherally outward from the peripheral edges 11a of the plate 11, and a bottom leg portion 131 integral with, and extending peripherally inward from the first leg portion 130 in underlapping relation with, but spaced away from the inner surface 11c of plate 11, as seen in FIGS. 1, 2 and 3. The molding sections 121 and 124 are attached by adhesive securement to all of the respective edges and surfaces of the frame 13 with which they are respectively in contact and the molding sections 121, 123, and 125 are adhered, by insert molding, to the respective surfaces of the plate 11 with which they contact. This enables the inner walls, outer walls, and bottom of the frame 13 to be effectively used. The molding 12 is adhered to the frame 13 by a butyl adhering agent. As shown in FIG. 1, a weather strip 4 is adhered around the frame 13. The weather strip 4 may also be formed integrally with and from the same material as the molding 12. In the same manner as the prior art, a washer 101 and a fastener 102 are attached to the bottom surface of the frame 13. A bracket 103 is held by the fastener 102. A shaft 104, which supports a roller 6, is coupled to the bracket 103. The roller 6 rolls along a guide rail 7 and enables the sliding window 1 to move with respect to the rail 7.

The sliding window 1 according to the present invention is provided with the resin plate peripherally 11 encompassed by the molding 12 in the frame 13. Accordingly, the dimensions of the sliding window 1 are determined by the dimensions of the frame 13. In addition, the molding 12 is provided with the thin section 120 located between the resin plate 11 and the frame 13. The thin section 120 is flexible in comparison with other parts of the molding 12. Therefore, the thin section 120 expands when low temperature causes contraction of the plate 11 as shown in FIG. 2. The contraction of the plate 11 is absorbed by the thin section 120. The thin section 120 contracts when high temperature causes expansion of the plate 11 as shown in FIG. 3. The expansion of the plate 11 is absorbed by the thin section 120. Accordingly, the thin section 120 of the molding 12 prevents changes in the dimensions of the frame 13 when the plate 11 is deformed by different temperatures. This, in turn, prevents deformation of the entire sliding window 1. As also illustrated in FIGS. 2 and 3, the second flexible section 121 of the molding 12 also flexes in response to the temperature-induced expansions and contractions of the plate 11, to permit the required movement in peripherally outward and inward directions with respect to the frame bottom leg portion 131, while maintaining the attachment between the plate 11 and frame 13.

The linear expansion coefficient of the frame 13 is almost the same as that of steel. Thus, the difference between the linear expansion coefficient of the frame 13 and that of the steel vehicle body including the roof 100 is small. Accordingly, the space defined between the periphery of the sliding window 1 and the roof 100, where the window 1 is fit into, remains substantially the same regardless of changes in the temperature. In addition, the space between the sliding window 1 and the roof 100 is kept sealed by the weather strip 4.

Figure 4:
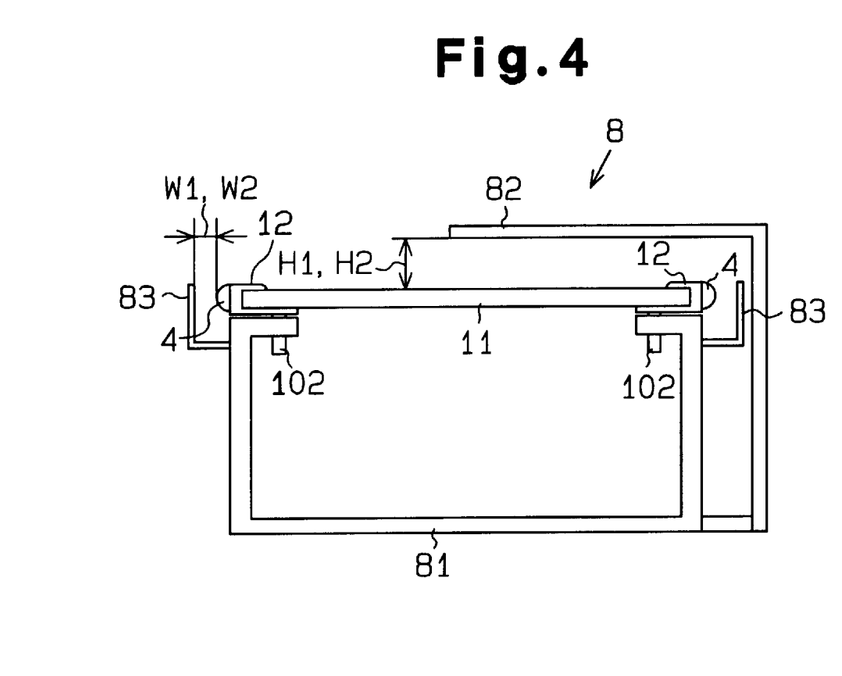
FIG. 4 is a schematic view showing a testing fixture.

The vertical and lateral linear deformation of the sliding window 1 was measured by a testing fixture 8 illustrated in FIG. 4. A thermoplastic elastomer (RABALON, registered trademark of Mitsubishi Kagaku Kabushiki Kaisha) was used for the molding 12.

Figure 5:
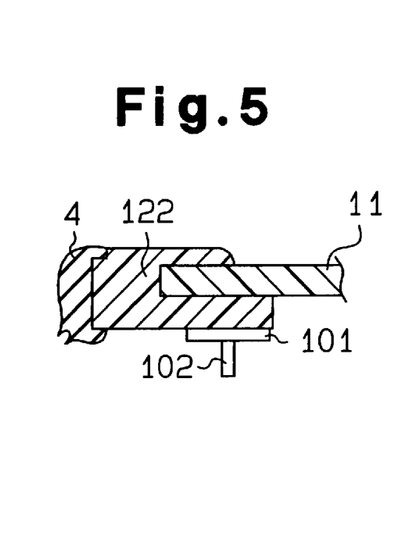
FIG. 5 is a cross-sectional view schematically showing the structure of a comparative product.

The vertical and lateral linear deformation of a comparative (prior art) product was also measured to compare data. The comparative product employed the same resin plate 11 as the sliding window 1 according to the present invention. Thus, each plate 11 is made of the same material. However, as shown in FIG. 5, a molding 122 of the comparative product is not provided with a thin section and is not peripherally encompassed by a frame. Thus, the molding 122 is directly connected to the weather strip 4. Polyamide 66, which is a well-known material, was used as the material of the molding 122. The remaining structure of the comparative product is the same as the structure of the sliding window 1 of the present invention.

As shown in FIG. 4, the testing fixture 8 includes a steel setting device 81, by which the sliding window 1 and the comparative product were held, a vertical reference bar 82, which indicates a vertical reference point (first reference point), and a lateral reference bar 83, which indicates a lateral reference point (second reference point). The sliding window that was to be tested was set on the setting device 81 so as to simulate conditions during actual usage.

The fasteners 102 of each sliding window were fixed to the setting device 81 when vertical linear deformation was measured and slidably connected to the device when linear lateral deformation was measured.

After each sliding window was set on the setting device 81, the vertical distance H1 between the first reference point and the sliding window and the lateral distance W1 between the second reference point and the sliding window was measured at room temperature (18 degrees Celsius). The vertical distance H2 between the first reference point and the sliding window and the lateral distance W2 between the second reference point and the sliding window was then measured at a high temperature (90 degrees Celsius). The vertical and lateral linear deformations $\Delta H$, $\Delta W$ obtained from the difference between the two temperature conditions were calculated as follows:

$$H2-H1=\Delta H, W2-W1=\Delta W$$

Figure 6:
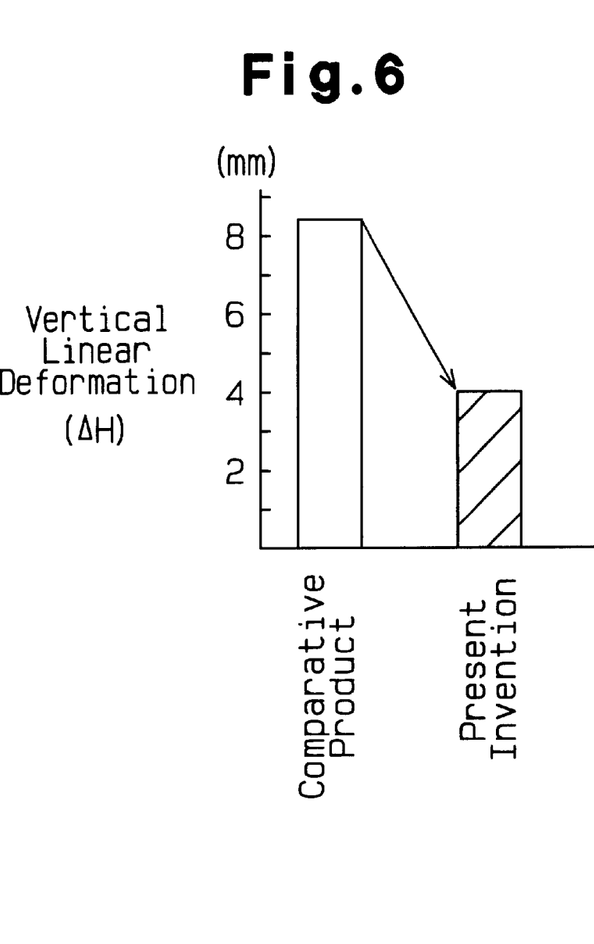
FIG. 6 is a graph illustrating vertical deformation.

FIG. 6 illustrates the results of the vertical linear deformation $\Delta H$ (mm). The lateral axis shows the measured subject while the vertical axis shows the vertical linear deformation $\Delta H$. It is evident from the graph that the vertical deformation of the sliding window according to the present invention was about half of that of the comparative product.

From this result, it may be understood that providing a thin section in the molding and using a flexible material for the molding sufficiently reduces vertical deformation.

The lateral deformation $\Delta W$ of the sliding window according to the present invention was 0.3 mm while the lateral deformation $\Delta W$ of the comparative product was 1.2 mm. From this result, it is apparent that the lateral linear deformation $\Delta W$ of the sliding window according to the present invention was drastically reduced in comparison with the comparative product representing the prior art sliding window.

It is apparent that the molding 12, which is made of a flexible material and is provided with the thin section 120, absorbs the deformation of the resin plate 2. In addition, the employment of a frame having a low linear expansion coefficient sufficiently suppresses deformation of the sliding window 1.

The effects of the hardness of the molding 12 employed in the sliding window of the present invention was also evaluated. As shown in table 1, six types of moldings, each having a different rubber hardness, were evaluated. Among these evaluation products, E1, E, E3 represent the moldings 12 having a satisfactory rubber hardness. The rubber harnesses of E1, E2, E3 are 20, 50, 80, respectively. The products outside the satisfactory hardness range are represented by C2, C3, C4. The rubber hardness of C2 is below 10 while that of C3 is 100. The rubber hardness of C4 exceeds 100.

TABLE 1

| Evaluation Product | C2 | E1 | E2 | E3 | C3 | C4 |
|---|---|---|---|---|---|---|
| Rubber Hardness | Below 10 | 20 | 50 | 80 | 100 | Over 100 |
| Moldability | Δ | O | O | O | O | O |
| Strength | Δ | O | O | O | O | O |
| Absorption Effect | O | O | O | O | Δ | X |

The evaluated items were moldability, strength, and absorption effect. Moldability was evaluated by judging the efficiency when filling a mold to insert-mold the molding 12 about the resin plate 11 and by judging how simple it was to release the mold after completion of the molding. Strength was evaluated by judging whether damage was inflicted on the molding 12 or whether the molding 12 fell off from the resin plate during actual usage of the sliding window. Absorption effect was evaluated by judging whether the thin section 120 of the molding 12 effectively absorbed the expansion and contraction of the glass. Each molding 12 was evaluated as good(O), satisfactory(Δ), and poor(X).

As evident from table 1, the moldability and strength of the molding becomes slightly inferior when the rubber hardness is lower than 10. The absorption effect of the molding 12 is lowered when the rubber hardness is 100 or greater. Accordingly, the advantages of the present invention are further ensured by maintaining the rubber hardness of the molding within the range of 20 to 80.

Although only one embodiment of the present invention has been described herein, it should be apparent to those skilled in the art that the present invention may be embodied in many other specific forms without departing from the spirit or scope of the invention.

Therefore, the present examples and embodiments are to be considered as illustrative and not restrictive and the invention is not to be limited to the details given herein, but may be modified within the scope of the appended claims.

What is claimed is:

1. A panel closing an opening provided within an outer surface of a vehicle body, said opening being defined by peripheral edges within said vehicle body outer surface, said panel comprising:

a plate within said vehicle body opening and having peripheral edges corresponding to, but spaced peripherally inward from respective of said peripheral edges which define said vehicle body opening, said plate having an outer surface on a side corresponding to said outer surface of the vehicle body, and an inner surface opposite to said outer surface, said peripheral edges of said plate extending between said outer and inner surfaces and defining a thickness of the plate, a peripheral frame having substantially L-shaped cross-section and peripherally surrounding said plate within said vehicle body opening, and further having peripheral edges corresponding to said respective peripheral edges of said plate, said L-shaped frame cross-section including a first leg portion generally parallel to, but spaced peripherally outward from said peripheral edges of the plate, and a bottom leg portion extending peripherally inward from said first leg portion in underlapping relation with, but spaced away from said inner surface of the plate to provide a spacing therebetween, and a peripherally extending molding comprising a thin flexible section extending between and secured to both of said first leg portion of said frame and said peripheral edges of said plate, said thin flexible section being out of contact with said bottom leg portion of said frame thereby permitting peripherally inward and outward flexing movement of said thin flexible section, and a second flexible section between and secured to both-of said inner surface of said plate and said bottom leg portion of said frame within said spacing therebetween but peripherally spaced away from said first leg portion of the frame thereby permitting peripherally inward and outward flexing movement of the second flexible section, said peripheral frame and said vehicle body outer surface being of hard materials respectively having linear expansion coefficients which are substantially equal to each other, said plate being of hard resin material having a higher linear expansion coefficient than said linear expansion coefficients of said frame and said vehicle body outer surface, and said thin and second flexible sections of said molding being flexible to absorb temperature-induced expansion and contraction deformations of said plate with respect to said frame.

2. A panel according to claim 1 wherein said peripherally extending molding further comprises a plate edge attachment section integral with and extending between said thin flexible section and said second flexible section and secured to and along said peripheral edges of said plate, said plate edge attachment section being peripherally spaced away from said first leg portion of said frame.

3. A panel according to claim 2 wherein said peripherally extending molding further comprises a frame attachment section integral with said thin flexible section and adhesively secured to and along said first leg portion of the frame, said frame attachment section being peripherally spaced away from said plate edge attachment section and said second flexible section.

4. A panel according to claim 1 wherein said thin flexible section of the peripherally extending molding extends peripherally outward in substantial alignment with said outer surface of said plate.

5. A panel according to claim 4 wherein said peripherally extending molding further comprises another flexible attachment section integral with said thin flexible section and said plate edge attachment section, and extending in overlapping relation with, and secured to said outer surface of said plate.

6. A panel according to claim 1, wherein said frame is made of a material selected from the group consisting of steel, aluminum and reinforced plastic.

7. A panel according to claim 6, wherein said plate is made of a material selected from the group consisting of polymethylmethacrylate and polycarbonate.

8. A panel according to claim 1, wherein said molding is made of one of soft rubber and soft resin having a rubber hardness within the range of 20 to 80.

9. A panel according to claim 8, wherein said molding is made of a material selected from the group consisting of polyvinyl chloride, ethylene-propylene-diene terpolymer, and olefin thermoplastic elastomer.

10. A panel according to claim 1, wherein said panel is a movable panel for selectively opening and closing said opening within said vehicle outer surface, and which further comprises means on said peripheral frame and means on said vehicle body connected to each other for permitting movement of said panel between respective positions opening and closing said vehicle body opening.

11. A panel according to claim 10, wherein said vehicle outer surface is a roof of said vehicle, said plate is of transparent resin material, and said means on said peripheral frame and said means on said vehicle body permit sliding movement between said positions, whereby said panel is a sliding window in said roof of the vehicle.

12. A panel according to claim 11, which further comprises a peripheral weather strip of flexible material secured to said first leg portion of said L-shaped frame and sealingly engaging said peripheral edges of said vehicle body opening when said panel closes said opening.

13. A panel according to claim 12, wherein said weather strip is joined with said molding.

* * * * *

UNITED STATES PATENT AND TRADEMARK OFFICE
CERTIFICATE OF CORRECTION

PATENT NO. : 5,992,928
DATED : November 30, 1999
INVENTOR(S) : Yoshifumi Kato et al.

It is certified that error appears in the above-identified patent and that said Letters Patent is hereby corrected as shown below:

Column 2,
Line 38, after "automobile" insert a comma -- , --;
Line 48, after "If" delete "the" and before "sliding" insert -- the --;
Line 52, change "insert molded" to -- insert-molded --.

Column 6,
Line 26, change "both-of" to -- both of --;
Line 54, delete "adhesively";

Signed and Sealed this

Ninth Day of April, 2002

Attest:

JAMES E. ROGAN
*Attesting Officer*     *Director of the United States Patent and Trademark Office*